3,330,375
MULTI-MODE ACOUSTIC WELL LOGGING
James E. White, Littleton, Colo., assignor to Marathon Oil Company, Findlay, Ohio, a corporation of Ohio
Filed Feb. 16, 1966, Ser. No. 527,969
12 Claims. (Cl. 181—.5)

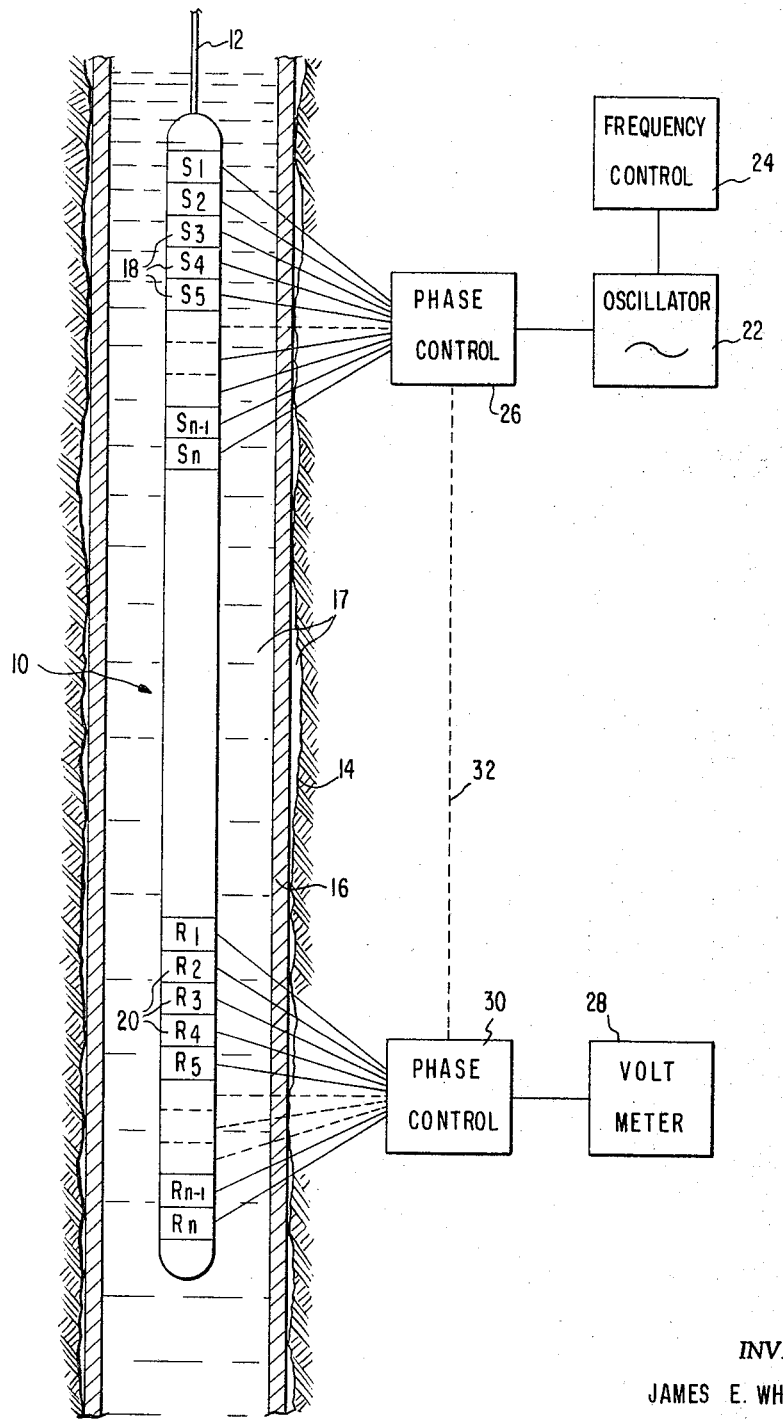

This invention relates in general to acoustic well logging, and more particularly to a novel method and apparatus for directly determining the speeds of acoustic waves propagating in both the shear and compressional modes in the surrounding formation, as well as the mud and casing speeds.

In the petroleum production industry it is desirable to know certain properties of the earth formations surrounding a bore hole, such as porosity, static overburden pressure, cementation structure, fluid content, etc., in order to evaluate the production potential of a well. These properties are directly related to several elastic constants of the formation, such as the modulus of rigidity, Young's modulus, and the bulk modulus. The determination of these moduli is greatly facilitated by knowing the value of Poisson's ratio for the formation, the latter being a pure number calculated from an expression in which the only unknowns are the shear and compressional mode velocities of acoustic or seismic waves propagating in the formation.

The measurement of compressional mode velocities is well known in the prior art, and generally involves recording the time required for a seismic pulse to travel through the formation from its point of origin to a receiver a known distance away. The accurate measurement of shear mode velocities is not known in the prior art, however, and such has usually been done indirectly by formulated approximations based on other more readily determinable parameters. These approximations are only hopeful estimates, at best, and often lead to wrong and costly decisions based on inaccurate formation property determinations made therefrom.

It is therefore a primary object of this invention to provide a novel method and apparatus for accurately and directly determining the propagation speeds of both shear and compressional mode waves in earth formations.

It is a further object of this invention to provide such a method and apparatus which employs an acoustic velocity filtering or tuning technique and which may also be used to determine the mud and casing speeds.

It is a further object of this invention to provide such a method and apparatus wherein the desired propagation velocities may all be quickly determined in a single, relatively simple scanning operation and which does not involve any precise and difficult time lapse measurements as in the prior art.

The foregoing and other objects, features and advantages of the invention will be apparent from the following more detailed description thereof, with reference to the accompanying drawing in which the single figure shows a logging apparatus, partly in block diagram form, constructed in accordance with the teachings of this invention in situ in a cased bore hole.

The essence of this invention resides in determining velocity from the expression, velocity=frequency×wavelength, by employing transmitter and/or receiver tuning techniques to accurately determine the wavelength for a known frequency. This may be done in several ways, all of which involve wavelength tuning by varying either frequency and/or phase shift, as more fully explained below.

Referring to the drawing, reference number 10 designates an acoustic velocity logging apparatus suspended by cable 12 in a bore hole 14 provided with a casing 16. The bore hole itself and the spaces between the casing and the bore hole walls are normally occupied by drilling mud, as indicated at 17. The logging apparatus 10 includes a plurality of sending or transmitting transducers 18, which may, for example, be piezoelectric elements, and a like plurality of receiving transducers 20. The physical distance or spacing between adjacent sending and receiving transducers is preferably the same. The sending transducers are energized by an oscillator 22, the frequency of which may be varied by the frequency control 24, through a phase control device 26. The latter may be employed to vary the phase shift between adjacent sending transducers from 0 through 360 degrees. The outputs from the receiving transducers are occupied to a voltmeter 28, or other amplitude monitoring device, through a second phase control device 30. Both phase control devices 26 and 30 may be ganged for joint operation as indicated by the broken line 32. It is to be understood that the electronic components shown to the right of the bore hole would actually be located at the surface and would be connected to the logging apparatus through the suspension cable 12 or through a separate, multi-conductor electrical cable. These electronic components are all well known in the art in various forms and will not be disclosed in detail herein, since their specific constructions form no part of the invention.

For a given formation, the shear and compressional mode velocities of acoustic waves propagating therein will have fixed, constant values, as will the mud and casing speeds. To facilitate an understanding of the operation of this invention, let it be assumed that these velocities are as follows:

|  | Ft./sec. |
|---|---|
| Mud velocity | 2,500 |
| Shear mode velocity | 5,000 |
| Compressional mode velocity | 10,000 |
| Casing velocity | 20,000 |

Let it be further assumed that the sending and receiving transducer arrays are each 2 feet long and comprise 20 equally spaced transducer elements. Considering now a first mode of operation utilizing all of the structure shown and varying only frequency, assume that the ganged phase control devices 26 and 30 are set so that the phase shift between adjacent sending and receiving transducers is 36°. Since 360° constitutes a complete oscillatory cycle, it will take 10 transducers or a linear distance of 1 foot to span a cycle, and therefore this particular phase shift setting establishes the sending and receiving array wavelengths at 1 foot. With the velocities of the various modes of propagation having constant values as stated above, and with the wavelength of the sending and receiving arrays set at a fixed value, there will therefore be only one frequency for each mode which will result in a maximum or peak signal amplitude at the receiver. Stated another way, complete signal reinforcement between all of the transducers at both the sending and receiving arrays will only occur at those frequencies which produce summation signals in the respective modes having wavelengths equal to 1 foot.

The desired mode velocities may therefore be determined by sweeping the frequency control 24, noting the frequencies which produce peak output signals, and then applying the equation, velocity=frequency×wavelength. As an example, assume that the frequency of the energizing signals is gradually increased, starting at 1000 cycles per second, by manipulating the frequency control 24. Since the full reinforcement or "resonant" wavelength of the sending and receiving arrays has been established at 1 foot by the phase control devices, such reinforcement will not occur until a frequency is reached, which, when multiplied by the 1 foot wavelength value, yields a product equal to the velocity of one of the unknown modes of propagation. At all other frequencies the acoustic signals from the individual sending transducers 18 will be out of phase with each other and at least partially interfering, and the amplitude of the composite or summation acoustic signal will be relatively low. The same situation will also exist in the receiving transducer array.

When the frequency of the energizing signals reaches 2500 cycles per second, however, a distinct amplitude peak will be sensed by the voltmeter 28 since the sending and receiving transducer arrays are now both tuned to support the slowest traveling mode of propagated energy, the mud wave. As the frequency is further increased signal interference will once more occur, decreasing the output amplitude, until the next peak is reached at 5000 cycles per second. Once again the output signal amplitude will rise sharply since the apparatus is now tuned to the shear mode wave. Similar peaks will be observed as the frequency is further increased at 10,000 and 20,000 cycles per second.

Once a sweep has been made and the peak producing frequencies recorded, the corresponding velocities can be easily calculated from the basic equation. As an alternative, the frequency control 24 may be calibrated to directly indicate velocity for the particular phase shift value selected. Matching the determined velocities to the proper modes presents no problem since it is generally known that mud speed is slowest, shear speed is less than compressional speed, and casing speed is fastest.

To summarize the operation described above, the sending and receiving transducer arrays were tuned, by establishing a fixed phase shift between adjacent transducers, to produce a maximum summation signal at a certain wavelength. The frequency of the energizing signals was then swept or scanned over a broad range and the frequencies that resulted in output signal peaks were noted, from which the desired velocities were determined. Looking at it another way, since the various mode velocities are all constant the product of frequency×wavelength for each mode must also be constant. Starting at a relatively low frequency and correspondingly high or long wavelength, the frequency was increased. This caused the wavelength to decrease until it reached a value of 1 foot for each mode, which resulted in output signal peaks.

The unknown wave velocities may also be determined by a similar type of tuning technique in which the frequency is held constant and the phase shift is varied. In this method the wavelength for each mode of propagation will be fixed, since both the velocities and the frequency are constant, and the tuned wavelength of the sending and receiving transducer arrays will be varied by sweeping the phase control devices. This will produce output signal peaks whenever the sending and receiving array wavelength equals one of the fixed propagation wavelengths, and the unknown velocities may then be calculated as before from the basic formula.

As an example, assume that the mode velocities are as stated earlier, the frequency is fixed at 5000 cycles per second and the phase shift between adjacent transducer elements is gradually increased from 0°. The first peak will be observed when the phase shift reaches 9°, for this corresponds to a wavelength of 4 feet which is the value of the casing mode wavelength $$\text{Wavelength}_{casing} = 20{,}000 \text{ ft./sec.} \div 5000 \text{ cycles/sec.} = 4 \text{ ft.}$$

As the phase shift is thereafter increased signal interference and cancellation once more occurs and the output amplitude falls off sharply until the next peak is reached at a phase shift value of 18°. This corresponds to a transducer array wavelength of 2 feet which is the fixed value of the compressional mode wavelength. Similar peaks are produced at phase angles of 36° and 72°, for which signal reinforcement occurs for the shear and mud velocities, respectively. Once again, the unknown velocities may be calculated by determining the peak producing wavelengths from the phase shifts, knowing the transducer spacings, and multiplying them by the fixed frequency value, or the phase control devices 26 and 30 may be calibrated to directly indicate velocity for the chosen frequency.

It will be appreciated from the foregoing that the velocity tuning concept of this invention involves either tuning the wavelength of the transmitted signal to that of a fixed value in the sending and receiving arrays by varying its frequency, or tuning the wavelength of the arrays to the fixed value of the transmitted wavelength by varying the phase shift between adjacent transducer elements. It should also be understood that the essential output signal peaks may be produced by concurrently varying both the frequency and phase shift parameters, although the velocity calculations using this technique are slightly more troublesome since the values of both variables must be recorded for each peak.

It is also possible to achieve the same results, i.e. to make the desired velocity determinations, using the same tuning techniques with more simplified forms of the logging apparatus shown in the drawing. Specifically, it is only necessary to employ a single sending transducer with plural receiving transducers or plural sending transducers with a single receiving transducer. Since tuning would only be effected at one end of the apparatus, rather than both, the amplitude peaks would not be as sharp, but their relative magnitudes with respect to the intermediate or interference outputs would still be sufficiently large to be readily distinguishable.

Using a single sending transducer and plural receiving transducers, for example, either the frequency of the transmitted signal or the phase shift between adjacent receiving transducers, or both, could be varied and peaks would be produced in the same manner described above. Signal reinforcement would only occur in the receiving array, however, and thus the peak amplitude would be reduced. With such an arrangement the phase control device 26, the ganging connection 32 and all but one of the sending transducers 18 could be eliminated.

Similarly, using plural sending transducers and a single receiving transducer, the frequency and/or the phase shift of the transmitted signals could be varied to produce the output peaks, and the phase control 30, connection 32 and all but one of the receiving transducers 20 could be eliminated.

While the invention has been particularly shown and described with reference to preferred embodiments thereof, it will be understood by those skilled in the art that various changes in form and details may be made therein without departing from the spirit and scope of the invention.

What is claimed is:

1. In a well logging system including electro-acoustic transducer means for transmitting and receiving signals, a method of determining the velocities of at least the shear and compressional mode waves propagating in a formation, comprising:
    (a) generating a periodic, acoustic wave form and propagating same through the formation, such propagation occurring in at least the shear and compressional modes,
    (b) sensing the amplitude of the propagated waveform, and
    (c) tuning the frequency and wavelength of the system to determine the values of these parameters that produce amplitude peaks in at least the shear and compressional modes, whereby their velocities may be determined from the equation, $$\text{velocity} = \text{frequency} \times \text{wavelength}$$

2. A method as defined in claim 1 wherein the tuning is accomplished by setting the frequency of the propagated waveform at a fixed value, and varying the wavelength of the transmitting and receiving transducer means.

3. A method as defined in claim 1 wherein the tuning is accomplished by setting the wavelength of the transmitting and receiving transducer means at a fixed value, and varying the frequency of the propagated waveform.

4. A method as defined in claim 1 wherein the tuning is accomplished by setting the frequency of the propagated waveform at a fixed value and varying the wavelength of the transmitting transducer means.

5. A method as defined in claim 1 wherein the tuning is accomplished by setting the frequency of the propagated waveform at a fixed value and varying the wavelength of the receiving transducer means.

6. A method as defined in claim 1 wherein the tuning is accomplished by setting the wavelength of the transmitting transducer means at a fixed value and varying the frequency of the propagated waveform.

7. A method as defined in claim 1 wherein the tuning is accomplished by setting the wavelength of the receiving transducer means at a fixed value and varying the frequency of the propagated waveform.

8. An acoustic well logging system for determining the velocities of at least shear and compressional mode waves propagating in a formation, comprising:
(a) first electro-acoustic transducer means for generating an acoustic waveform and propagating same through the formation, such propagation occurring in at least the shear and compressional modes,
(b) second electro-acoustic transducer means for receiving the propagated waveform,
(c) means for energizing the first transducer means with a periodic signal,
(d) means for sensing the amplitude of the propagated waveform received by the second transducer means, and
(e) means for tuning the frequency and wavelength parameters of the system to produce amplitude peaks in at least the shear and compressional mode waves, whereby their velocities may be determined from the equation, velocity=frequency×wavelength.

9. An acoustic well logging system as defined in claim 8 wherein the first and second transducer means each comprises an equal plurality of stacked, equally spaced transducer elements and both stacks are substantially axially aligned.

10. An acoustic well logging system as defined in claim 9 wherein the means for tuning comprises a variable frequency control for the energizing means and individual, ganged, variable phase shift controls for the first and second transducer means.

11. An acoustic well logging system as defined in claim 8 wherein the first transducer means comprises a single transducer element, the second transducer means comprises a plurality of stacked, equally spaced transducer elements, and the means for tuning comprises a variable frequency control for the energizing means and a variable phase shift control for the second transducer means.

12. An acoustic well logging system as defined in claim 8 wherein the first transducer means comprises a plurality of stacked, equally spaced transducer elements, the second transducer means comprises a single transducer element, and the means for tuning comprises a variable frequency control for the energizing means and a variable phase shift control for the first transducer means.

References Cited

UNITED STATES PATENTS

| | | | |
|---|---|---|---|
| 2,231,243 | 2/1941 | Beers | 181—.5 |
| 2,244,484 | 6/1941 | Beers | 181—.5 |
| 2,249,108 | 7/1941 | Beers | 181—.5 |
| 2,350,371 | 6/1944 | Smith | 340—18 |
| 2,868,311 | 1/1959 | Tallos | 181—.5 |
| 3,073,406 | 1/1963 | Westphal | 181—.5 |

BENJAMIN A. BORCHELT, *Primary Examiner.*

R. M. SKOLNIK, *Assistant Examiner.*